Sept. 22, 1959 P. F. HAYSE 2,905,254
WHEEL MOUNTED TANDEM DISK HARROW
Filed Jan. 23, 1956 2 Sheets-Sheet 1
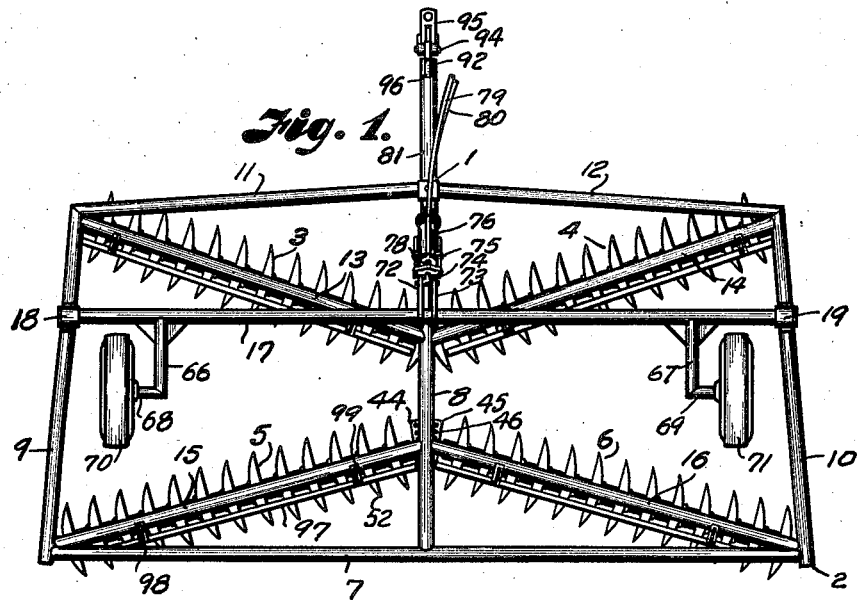
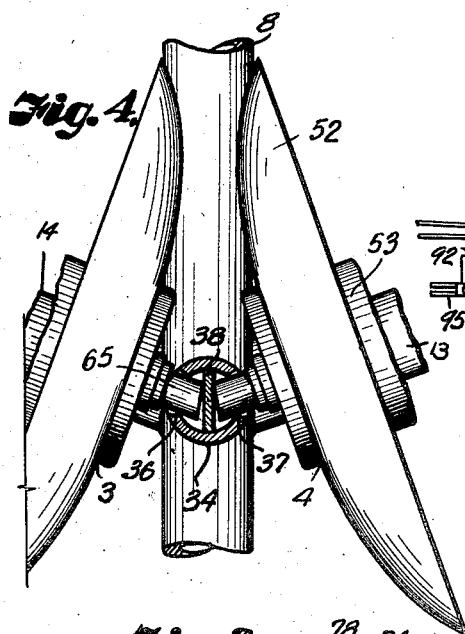
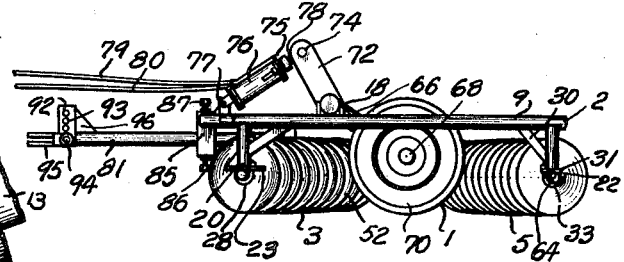
INVENTOR.
Paul F. Hayse.
BY
Paul E. Mullendore
ATTORNEY Sept. 22, 1959  P. F. HAYSE  2,905,254
WHEEL MOUNTED TANDEM DISK HARROW
Filed Jan. 23, 1956  2 Sheets-Sheet 2
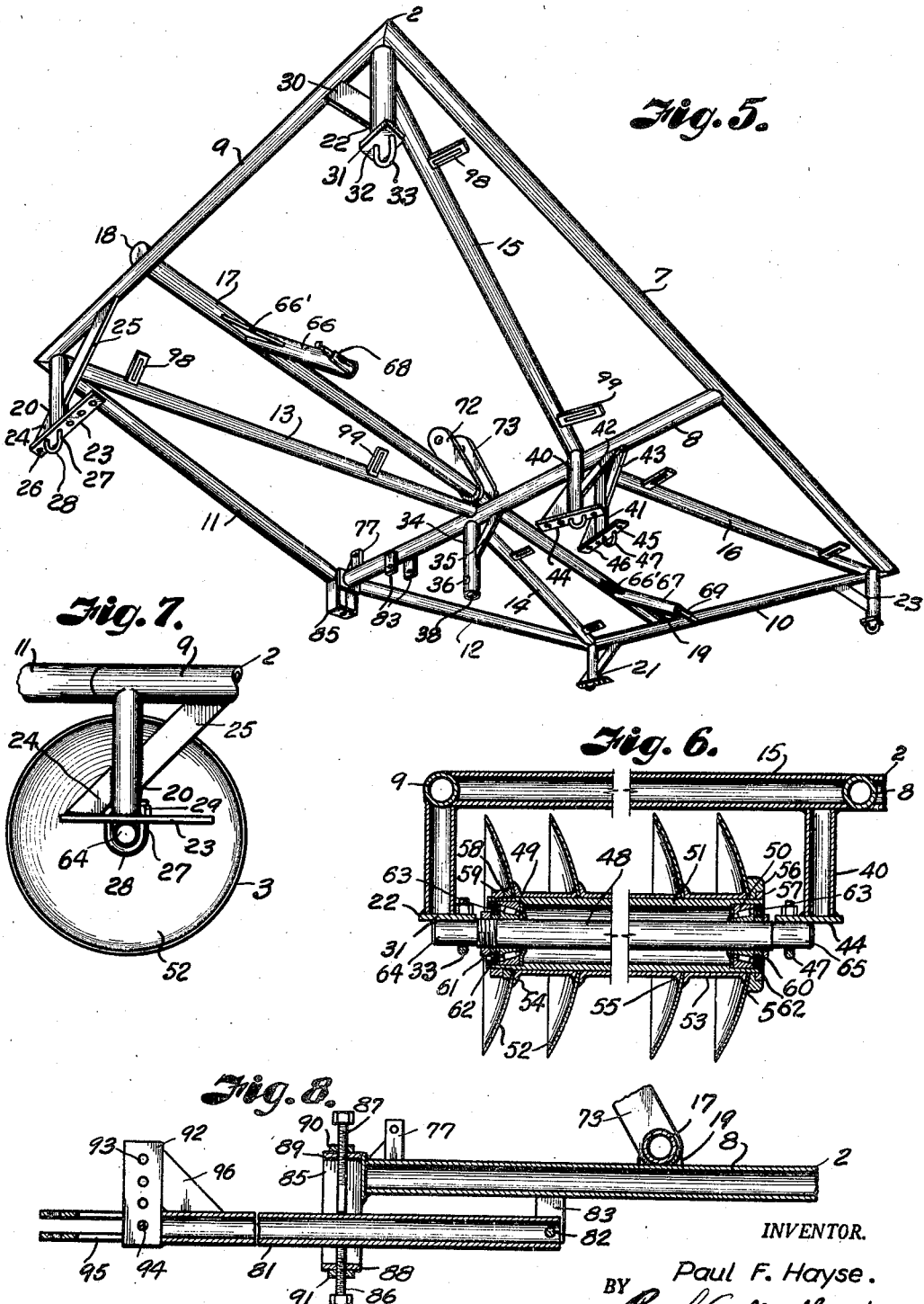
INVENTOR.
Paul F. Hayse.
BY Paul E. Mullendore
ATTORNEY.

United States Patent Office 2,905,254
Patented Sept. 22, 1959

2,905,254

WHEEL MOUNTED TANDEM DISK HARROW

Paul F. Hayse, Pratt, Kans., assignor to Harvester Plow Co., Inc., Pratt, Kans., a corporation of Oklahoma Application January 23, 1956, Serial No. 560,572

4 Claims. (Cl. 172—413)

This invention relates to a disk harrow of the wheel mounted type and has for its principal objects to provide a machine of this character that is lighter to pull and to provide a rigid frame for obtaining uniform distribution of weight on the disk blades.

Other objects of the invention are to provide substantially rigid disk gangs which are rotatably supported on axle shafts with the ends of the shafts being anchored to hangers forming parts of the frame, thereby providing freer and easier rotatable disk gangs; to provide a support of the disk gangs on the frame which permits a simple adjustment for changing angularity of the gangs on the respective sides of the center of draft; to provide a mounting for the front disk gangs so as to eliminate an unworked ridge of soil between the adjacent ends of the gangs; to provide hangers that permit anchoring of the axle shafts at the ends so that one end forms a pivot when changing the angle thereof; and to provide an improved hitch to control balance of the frame on the ground wheels, and the height of the hitch relatively to the draw bar of a tractor.

In accomplishing these and other objects of the invention, hereinafter pointed out, I have provided improved structure, the preferred form of which is illustrated in the accompanying drawings wherein:

Fig. 1 is a plan view of a wheel mounted tandem disk harrow constructed in accordance with the present invention.

Fig. 2 is a side elevational view of the harrow showing the ground wheels raised relatively to the frame to bring the disk gangs into position for pulverizing the earth and for maintaining a depth of cut that is desired.

Fig. 3 is a similar view but showing the ground wheels lowered relatively to the frame for raising the disk gangs out of engagement with the ground.

Fig. 4 is a fragmentary, horizontal section, looking upwardly toward the under side of the frame and showing the inner anchored ends of the front disk gangs to show the compactness of the connection to maintain a close relationship of the adjacent disks of the respective gang sections.

Fig. 5 is an enlarged, underneath, perspective view of the harrow frame particularly illustrating the disk gang hangers.

Fig. 6 is a section through the frame and one of the rear disk gangs, the central portion being broken out to shorten the figure.

Fig. 7 is a fragmentary end view of one of the corners of the frame, particularly illustrating the hanger which depends therefrom.

Fig. 8 is a longitudinal section through the front end of the central portion of the frame particularly illustrating the hitch therefor.

Fig. 9 is a modified form of inner hanger for the front disk gangs.

Referring more in detail to the drawings:

1 designates a wheel mounted disk harrow constructed in accordance with the present invention and which has a frame 2 supporting front disk gangs 3—4 and rear disk gangs 5—6.

The frame 2 comprises a transversely extending rear member 7; a central, longitudinal member 8, extending forwardly from the mid-portion of the member 7; outer side members 9 and 10, extending from the ends of the member 7 and converging slightly toward the central longitudinal member 8; and front members 11 and 12 which are connected with forward ends of the side members 9 and 10 and converge slightly in a forward direction to join with the forward end of the central longitudinal member 8. The frame also includes angularly extending front and rear brace members 13—14 and 15—16 on the respective sides of the longitudinal member 8. The rear brace members 15—16 are connected with the rear corners of the frame and extend angularly therefrom to connect with the central member at a point spaced forwardly of the rear member 7. The front angular members 13—14 are connected with the central longitudinal member 8 forwardly of the connections of the angular brace members 15—16 and extend to the forward corners of the frame to connect therewith, as best shown in Figs. 1 and 4. The brace members 13—14 and 15—16 are located so that they form a truss over the disk gangs 3—4 and 5—6 to stiffen the frame and to cooperate with axle-shafts of the disk gangs in maintaining rigidity of the disk gangs when the harrow is in use. Extending transversely of the frame at a point slightly forward of the connection of the inner ends of the brace members 13—14 with the central member 8 is a rock-shaft 17. The rock shaft 17, while being oscillatably carried by the frame, cooperates with the other members of the frame in maintaining a substantially rigid assembly when the members of the frame are connected together, as by welding or the like. The frame members may be formed from suitable structural shapes. However, tubing, when welded together, provides a most satisfactory and serviceable frame having high-strength, light-weight ratio.

Fixed to and depending from the front and rear corners of the frame are hangers 20—21 and 22—23. The front hangers 20—21, each include a post member, also tubular material and fixed to the lower ends thereof are transverse plates 23 which extend substantially parallel with the side members 9 and 10. The forward ends of the plates 23 are braced with respect to the posts by gusset plates 24 and the posts are braced from the side members of the frame by bars 25 having their ends welded to the tubular members of the hangers and to frame members, as best shown in Figs. 5 and 7. The plates 23 have a series of holes 26 for passing the shanks 27 of U bolts 28. The U bolts 28 are arranged so that the shanks extend upwardly and are supported by nuts 29 that are threaded thereon for securing the outer ends of the front disk gangs, as later described. The rear hangers 22 and 23 also include depending tubular members that are braced in a forward direction by bars 30, similar to the bars previously described. Fixed to the lower end of the hanger members 22 and 23 are shorter plates 31 having a single pair of openings 32 for mounting U bolts 33, similar to the U bolts previously described. Cooperating with the front hangers and depending from the central members of the frame substantially adjacent to the point of connection of the brace members 13—14 is a single tubular member forming a hanger 34 that is braced from the longitudinal member of the frame by a rear bar 35. The hanger 34 is slightly longer than the front hangers and the sides thereof have openings 36 and 37 with the upper edges thereof in plane with the plates of the other hangers. The open lower end of the hanger is divided by a plate 38 which is welded therein for a purpose to be later described.

Fixed to and depending from the inner ends of the rear brace members 15—16 at a point near the connection with the central longitudinal member of the frame are hangers 40 and 41 braced from the central member 8 by bars 42 and 43, similar to the bars 25 of the front hangers previously described. Fixed to the lower ends of the hangers 40 and 41 are plates 44 and 45 that extend transversely relatively to the rear brace members 15—16 and which are provided with a series of holes 46 for U bolts 47.

Each disk gang includes an axle-shaft 48 carrying anti-friction bearings 49 and 50 near the respective ends thereof for mounting a barrel 51 thereon. The barrel carries a plurality of concave-convex disks 52 that are spaced apart by sleeves 53 having flanges 54 on one end bearing against the convex side of one disk and a smaller flange 55 bearing against the concave side of the adjacent disk, as shown in Fig. 6. The disks and spacers are clamped together on the barrel between a washer 56 that is backed on one end of the barrel by an annular flange 57 and a washer 58 that is backed on the opposite end of the barrel by a clamping nut 59. The barrel is retained from longitudinal movement on the axle-shaft 48 by a collar 60 at one end and an adjusting nut 61 at the opposite end, as shown in Fig. 6, spacers 62 being inserted between the collar 60 and bearing 50 and between the adjusting nut 61 and the adjacent bearing 49. The ends of the barrel are closed by sealing elements 63 having sealing contact with the respective spacers. The disk gangs form specifically no part of the present invention with the exception that the disk gangs each comprise a unit rotatably mounted on the axle-shafts and which have projecting ends 64 and 65. The disks forming the front gangs are positioned with the concave faces facing toward the outer sides of the harrow and the disks forming the rear gangs have their concave sides facing toward the center of the frame, as best shown in Fig. 1, whereby the front disk gangs contact and move the soil in one direction and the rear disk gangs move the soil in the opposite direction. The projecting ends 65 at the innermost ends of the front disk gangs are inserted within the openings 36 and 37 and abut against a division plate 38. The opposite projecting ends of the axle-shafts for the front disk gangs are carried by the U bolts 28 which are engaged with any of two adjacent openings in the plates 23 depending upon the angle at which the front gangs 3 and 4 are to be supported. The rear disk gangs 5 and 6 are mounted with the outer ends of their axle-shafts clamped to the plates 31 on the corner hangers 22 and 23 by means of the U bolts 33 and the inner ends of the shafts are clamped to the plates 44 and 45 of the hangers 40 and 41 by the U bolts 47 which may be mounted in any pair of openings in the plates of the hangers depending upon the angle at which the rear disk gangs are to be used.

Fixed to and extending downwardly from the rock-shaft 17 are arms 66 and 67 which are also formed of tubular stock, similar to the frame members. The arms 66 and 67 are preferably braced with respect to the rock-shaft by gussets 66' that are welded in the angles between the arms and rock shaft, as best shown in Fig. 1. Extending laterally from the arms 66 and 67 are spindles 68 and 69 to carry ground wheels 70 and 71 for supporting the frame with gangs at fixed elevations which determine the depths at which the disks operate in the soil, as later described.

In order to support the wheels in their various positions, the mid-portion of the rack-shaft carries laterally extending arms 72 and 73 that are fixed thereto and are interconnected at their outer ends with a pin 74 to connect a jack mechanism 75. In the illustrated instance, the jack mechanism is of the hydraulic type and includes a cylinder 76 that is connected at one end to an ear 77 carried at the forward end of the central member 8 of the frame. The jack mechanism also includes a piston (not shown) which is slidably mounted in the cylinder and is connected with the cross pin 74 by a rod 78. The hydraulic fluid is supplied to and exhausted from the respective ends of the cylinder through ducts 79 and 80 that are connected with a hydraulic fluid supply, for example, the hydraulic system of a tractor which is used in pulling the harrow.

In order to connect the harrow with the tractor, the frame has a tongue 81 located in substantial alignment with the center member 8 of the frame with the rear thereof pivotally connected by means of a pin 82 with ears 83 and 84 that depend from the respective sides of the central member of the frame, as best shown in Fig. 8. The forward end of the tongue 81 extends through a yoke 85 and is supported at a predetermined height depending upon the height of the draft bar of the tractor by means of adjusting screws 86 and 87, the adjusting screw 86 being adjustably mounted in the cross bar portion 88 of the yoke and the adjusting screw 87 being similarly mounted in a cross bar portion 89 forming the top of the yoke. The screws are retained in an adjusted position by jamb nuts 90 and 91 (Fig. 8). Fixed to the forward end of the tongue is a vertical plate 92 having a series of openings 93 for a pin 94 which supports a clevis 95 by which the tongue is connected to the draw bar of the tractor. The plate 92 is preferably braced with respect to the tongue 81 by means of a gusset plate 96, as best shown in Fig. 8. The disk gangs also include scraper assemblies 97 (Fig. 1) which are supported from the brace members of the frame through ears 98 and 99 (Figs. 1 and 5).

The modified form of inner hanger illustrated in Fig. 9 for mounting the inner ends of the forward disk gangs is made up of plates 100 and 101 arranged with their forward edges welded to the forward edge of a center plate 102 to diverge rearwardly for accommodating the ends 65 of the disk gangs therebetween when the ends 64 and 65 of the shafts are engaged in openings 103 and 104 of the angular plates.

In using the harrow, the clevis 95 is connected with the draw bar of the tractor, not shown, and the tongue 81 is adjusted by means of the set screws 86 and 87 to give the desired position of the harrow frame. For example, if the front disk gangs are set to make a deeper cut than the rear disks, the frame is tilted downwardly in a forward direction by slacking off the set screw 87 and tightening the set screw 86. If equal penetration is desired for the front and rear disk gangs, the frame is adjusted to a level position.

In normal soil, the wheels 70 and 71 are raised slightly out of contact with the ground when the disks are engaged therein. If a different depth is desired, the wheels may be raised or lowered to support the disk gangs for the desired depth of cut.

To change the angle of the front disk gangs relative to the rear disk gangs, the U bolts 28 are removed and the outer ends of the shafts are moved forwardly or rearwardly under the plates 23 to bring the shafts to the desired angle. During this adjustment, the ends 65 of the shafts pivot slightly within the openings 36 and 37 of the inner hanger. When the disk gangs are at the desired angle, the U bolts 28 are replaced and the nuts are tightened to draw the ends 64 of the shafts into clamping engagement with the plates 23 of the hangers.

The rear disk gangs are adjusted in a similar manner by removing the U bolts 47 from the inner hangers and moving the shafts under the plates 44 and 45 until they are in proper position. During this adjustment, the outer ends 64 of the axle shafts pivot sufficiently within the U bolts 33. The U bolts 47 are then replaced and tightened to retain the disk gangs in their readjusted angular positions.

Because of the preferably seamless tubing construction of the frame and the welding of the tubular parts of the frame together, the harrow is very rigid and may be used for leveling uneven ground. It is recommended that weight first be added to the frame, in accordance with well-known practice and the depth of the ground wheels 70 and 71 be adjusted to maintain the desired depth of cut. The angle of the disk gangs may also be changed for best effect. The rigid construction afforded by the tubular frame also provides an effective distribution of the weight over the entire disk area of the harrow.

From the foregoing, it is obvious that I have provided a tandem disk harrow wherein the angle of the disk gangs is easily adjusted and that the construction of the frame provides the rigidity required to maintain penetration of the disk blades.

What I claim and desire to secure by Letters Patent is:

1. A disk harrow, including longitudinal side members, a rear transverse member having ends connecting rear ends of the longitudinal side members, a front transverse member having ends connecting forward ends of the longitudinal side members, said connecting ends providing corners of a generally rectangular frame, a central longitudinal member interconnecting the front and rear transverse members midway of the length thereof, diagonal members having inner ends connected with the central longitudinal member and having outer ends extending to and connected with the respective corners to provide open spaces therebetween, wheels within said spaces on the inside of the side longitudinal members, means for mounting the wheels on the frame for raising and lowering the frame over the wheels for adjustably supporting the frame from the ground, hangers having leg portions depending from the ends of the longitudinal side members near the corners of the frame and having plates fixed to the lower ends thereof provided with pairs of apertures, a tubular hanger depending from the central longitudinal member substantially at the point of connection of the foremost diagonal members and having openings in opposite sides thereof with a plate divider intermediate said openings, forward gangs having shafts extending in the general direction of the forward diagonals and having inner ends mounted in said openings of the tubular member and having outer ends extending transversely of the plates of the hangers near the front corners of the frame, hangers having leg portions depending from the rear diagonals near the point of connection with the longitudinal member and having similar transverse plates fixed to their lower ends, rear disk gangs having shafts extending in the general direction of the rear diagonals and having ends extending transversely of the plates of the last named hangers and the hangers near the rear corners of the frame, and U bolts for clamping the outer ends of the foremost gangs and the ends of the rear gangs to said plates, said plates of the hangers at the front corners of the frame and the plates of the hangers which depends from the inner ends of the rear diagonals having a plurality of said pairs of apertures to adjust angularity of the disk gangs.

2. A disk harrow, including longitudinal side members, a rear transverse member having ends connecting rear ends of the longitudinal side members, a front transverse member having ends connecting forward ends of the longitudinal side members, said connecting ends of said members providing corners of a generally rectangular frame, a central longitudinal member interconnecting the front and rear transverse members midway of the length thereof, diagonal members having inner ends connected with the central longitudinal member and having outer ends extending to and connected with the respective corners to provide open spaces therebetween on respective sides of the central longitudinal member, a transverse rock shaft extending across said open spaces on the front sides thereof, means on said longitudinal side members for journaling ends of the rock shaft, arms fixed to the rock shaft and extending rearwardly therefrom toward the transverse center of said spaces, laterally extending spindles on ends of the arms, ground wheels journaled on the spindles within said spaces on the inside of the longitudinal side members whereby the frame is adapted to be raised and lowered over the wheels for adjustably supporting said frame from the ground, hangers having leg portions depending from the ends of the longitudinal side members near the corners of the frame and having plates fixed to the lower ends thereof provided with pairs of apertures, a hanger depending from the central longitudinal member substantially at the point of connection of the foremost diagonal members and having openings in opposite sides thereof with a plate divider intermediate said openings, forward disk gangs having shafts extending in the general direction of the forward diagonals and having inner ends mounted in said openings in abutting contact with the divider plate and having outer ends extending transversely of the plates of the hangers near the front corners of the frame, hangers having leg portions depending from the rear diagonals near the point of connection with the longitudinal member and having similar transverse plates fixed to their lower ends, rear disk gangs having shafts extending in the general direction of the rear diagonals and having ends extending transversely of plates of the last named hangers and the depending hangers near the rear corners of the frame, and U bolts for clamping the outer ends of the shafts of the foremost disk gangs and the ends of the shafts of the rear gangs to said plates, said plates of the hangers at the front corners of the frame and the plates of the hangers which depend from the inner ends of the rear diagonals having a plurality of said pairs of apertures to adjust the angularity of the disk gangs.

3. A disk harrow as described in claim 2, wherein all of said frame members and said legs of the hangers are tubular, and said connection of one with the other being by welds to provide a unitary structure.

4. A disk harrow including front, rear and side members providing a transverse frame of generally rectangular shape, a central longitudinal member connecting said front and rear members midway of the width of the frame, brace members having inner ends spaced apart and connected with a midportion of the longitudinal member and diverging outwardly for connection with corners of the frame, outer hangers rigidly connected with and depending from the corners of the frame, inner hangers rigidly connected with and depending from parts of the frame immediately adjacent the connections of the inner ends of the brace members with the longitudinal member, front and rear disk gangs between the inner and outer hangers and extending under the respective front and rear brace members whereby the front and rear gangs on the respective sides of the central longitudinal member diverge substantially in accordance with the divergence of the brace members to provide spaces therebetween increasing in width toward the sides of the frame, front and rear axle shafts having ends for support by the hangers to rotatably mount the disk gangs, means pivotally connecting inner ends of each front axle shaft and outer ends of the rear axle shafts with their supporting hangers, means adjustably connecting the other ends of the axle shafts to their supporting hangers, ground wheels in the wider portion of said spaces and inset with respect to outer ends of the disk gangs to operate on ground subsequently worked by the rearmost disk gangs, a rock shaft carried transversely on the frame over said spaces, arms on said rock shaft operable through the spaces between the diverging brace members, and axles on the arms for journaling the ground wheels in the spaces between the disk gangs.

References Cited in the file of this patent

UNITED STATES PATENTS

| | | |
|---|---|---|
| 337,773 | Ladow | Mar. 9, 1886 |
| 388,567 | Ladow | Aug. 28, 1888 |
| 639,829 | Schaffer | Dec. 26, 1899 |
| 1,531,278 | Flatley | Mar. 31, 1925 |
| 1,762,633 | Johnson | June 10, 1930 |
| 1,830,761 | Johnson | Nov. 10, 1931 |
| 2,494,381 | Evans | Jan. 10, 1950 |
| 2,609,647 | Love | Sept. 9, 1952 |
| 2,717,479 | Scheidenhelm | Sept. 13, 1955 |
| 2,777,375 | Carlin et al. | Jan. 15, 1957 |
| 2,797,542 | Webster et al. | July 2, 1957 |
| 2,800,757 | Tufford | July 30, 1957 |